US007178795B2

(12) United States Patent
Huprikar et al.

(10) Patent No.: US 7,178,795 B2
(45) Date of Patent: Feb. 20, 2007

(54) MOUNTING ASSEMBLY FOR A VEHICLE SUSPENSION COMPONENT

(75) Inventors: Anand Huprikar, Novi, MI (US); Nathaniel Mitchell, Ann Arbor, MI (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 10/744,450

(22) Filed: Dec. 23, 2003

(65) Prior Publication Data

US 2005/0133322 A1    Jun. 23, 2005

(51) Int. Cl.
*F16F 7/00* (2006.01)

(52) U.S. Cl. ............... 267/141.1; 267/140.3; 267/140.13; 280/147.155; 248/560

(58) Field of Classification Search ........... 267/136, 267/137, 140.11, 140.12, 140.13, 140.3, 0.4, 267/141, 220, 141.1–141.5; 188/321.11; 248/562, 560, 6
See application file for complete search history.

(56) References Cited

U.S. PATENT DOCUMENTS

| 4,286,777 A | | 9/1981 | Brown ................ 267/63 R |
| 4,434,977 A | | 3/1984 | Chiba et al. ............ 267/33 |
| 4,478,396 A | | 10/1984 | Kawaura ............... 267/8 R |
| 4,487,402 A | * | 12/1984 | Takayanagi et al. ..... 267/141.2 |
| 4,957,279 A | * | 9/1990 | Thorn ................ 267/140.5 |
| 5,040,775 A | * | 8/1991 | Miyakawa ............ 267/220 |
| 5,248,134 A | | 9/1993 | Ferguson et al. ........ 267/220 |
| 5,263,692 A | * | 11/1993 | Ito ................. 267/140.12 |
| 5,330,166 A | | 7/1994 | Aoki ................. 267/220 |
| 5,799,930 A | | 9/1998 | Willett ............... 267/141.4 |
| 5,975,505 A | | 11/1999 | Yoshimoto et al. ....... 267/33 |
| 6,076,794 A | | 6/2000 | Pradel ................ 248/562 |
| 6,260,835 B1 | | 7/2001 | Angels et al. .......... 267/220 |
| 6,260,836 B1 | * | 7/2001 | Aoyama et al. ........ 267/221 |
| 6,290,218 B1 | * | 9/2001 | Mayerbock ............ 267/220 |
| 6,361,096 B2 | | 3/2002 | Kim ................. 296/35.1 |
| 6,662,683 B1 | * | 12/2003 | Takahashi et al. ....... 74/573 F |
| 2004/0017035 A1 | * | 1/2004 | Treder et al. .......... 267/220 |

FOREIGN PATENT DOCUMENTS

| EP | 0 386 735 A1 | | 9/1990 |
| EP | 0851143 A2 | * | 7/1998 |
| FR | 2135551 | | 12/1972 |
| FR | 2572338 A1 | * | 5/1986 |
| FR | 2829818 | | 3/2003 |
| GB | 1 389 731 | | 4/1975 |
| JP | 63255111 A | * | 10/1988 |

* cited by examiner

*Primary Examiner*—Melody M. Burch
(74) *Attorney, Agent, or Firm*—Fernando A. Borrego

(57) ABSTRACT

A mounting assembly for a vehicle suspension component comprising a support housing having an aperture. A rod is partially disposed within the aperture and displaceable relative to the support housing along a line of travel. A rigid core is fixedly mounted to the rod and moves with the rod. An insulator is disposed about the rigid core between the support housing and the rigid core. The insulator has a number of portions separable from each other and separately placed about the rigid core. The portions each have interlocking sections cooperating with each other to couple the portions together and encapsulate the rigid core such that the rigid core is isolated from the support housing.

19 Claims, 2 Drawing Sheets

MOUNTING ASSEMBLY FOR A VEHICLE SUSPENSION COMPONENT

BACKGROUND OF THE INVENTION

1. Field of the Invention

The subject invention relates to a mounting assembly for a vehicle wherein the mounting assembly has an insulator for isolating vibration and controlling the total movement.

2. Description of Related Art

Mounting assemblies for vehicles are well known in the art. Mounting assemblies of the prior art come in a variety of forms and are used in numerous applications. For example, mounting assemblies are frequently used to isolate vibration and control movements of a vehicle frame relative to a vehicle body. These types of mounting assemblies, such as disclosed in U.S. Pat. Nos. 4,286,777; 5,799,930; and 6,361,096, include a support housing mounted to the vehicle frame and a carrier mounted to a vehicle body. The carrier is coupled to the support housing through one or more insulators and a bolt.

Mounting assemblies are also frequently used for wheel suspension systems. Examples of such mounting assemblies are shown in U.S. Pat. Nos. 4,434,977; 4,478,396; 5,248,134; 5,330,166; 5,975,505; 6,076,794; and 6,260,835. Each of these mounting assemblies include a rigid support housing mounted to a chassis or frame of a vehicle. A piston rod extends from the wheel suspension system through the support housing. One or more insulators couple the piston rod to the support housing and allow for some relative movement of the piston rod relative to the support housing. The insulators isolate vibrations of the piston rod during an application of a force from the wheel suspension system, without causing excessive displacement.

The prior art mounting assemblies for both the vehicle body and the wheel suspension system are typically formed of an elastomeric rubber or cellular polyurethane material. Further, the prior art insulators are usually molded to the respective portions of the mounting assembly. Molding the insulators within the mounting assemblies creates an additional time consuming process during the manufacture of these assemblies.

As disclosed in U.S. Pat. No. 4,478,396, the prior art has recognized the deficiencies with molding the insulators and has contemplated forming the insulators separately from the mounting assemblies. In particular, the insulators of the '396 patent are formed into two pieces and then disposed within the mounting assembly. Although the insulator design of the '396 patent is an improvement over the prior art, this design has likewise had a number of deficiencies.

SUMMARY OF THE INVENTION AND ADVANTAGES

A mounting assembly for a vehicle comprising a support housing having an aperture and adapted to be mounted to the vehicle. A shaft is at least partially disposed within the aperture and displaceable relative to the support housing along a line of travel. A rigid core is fixedly mounted to the shaft and movable relative to the support housing during displacement of the shaft. An insulator is disposed about the rigid core between the support housing and the rigid core. The insulator has a plurality of portions separable from each other and separately placed about the rigid core with the portions each having interlocking sections cooperating with each other to couple the portions together and encapsulate the rigid core such that the rigid core is isolated from the support housing.

In the preferred embodiment, the insulator includes a first portion having a first body and a first interlocking section extending from the first body for partially encapsulating the rigid core. The insulator also includes a second portion separable from the first portion and having a second body and a second interlocking section extending from the second body. The first interlocking section cooperates with the second interlocking section to couple the first portion to the second portion for fully encapsulating the rigid core such that the rigid core is completely isolated from the support housing.

Accordingly, the subject invention includes an improved insulator having a multiple piece configuration with interlocking sections. The interlocking sections ensure that the portions of the insulator are properly coupled together in the mounting assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
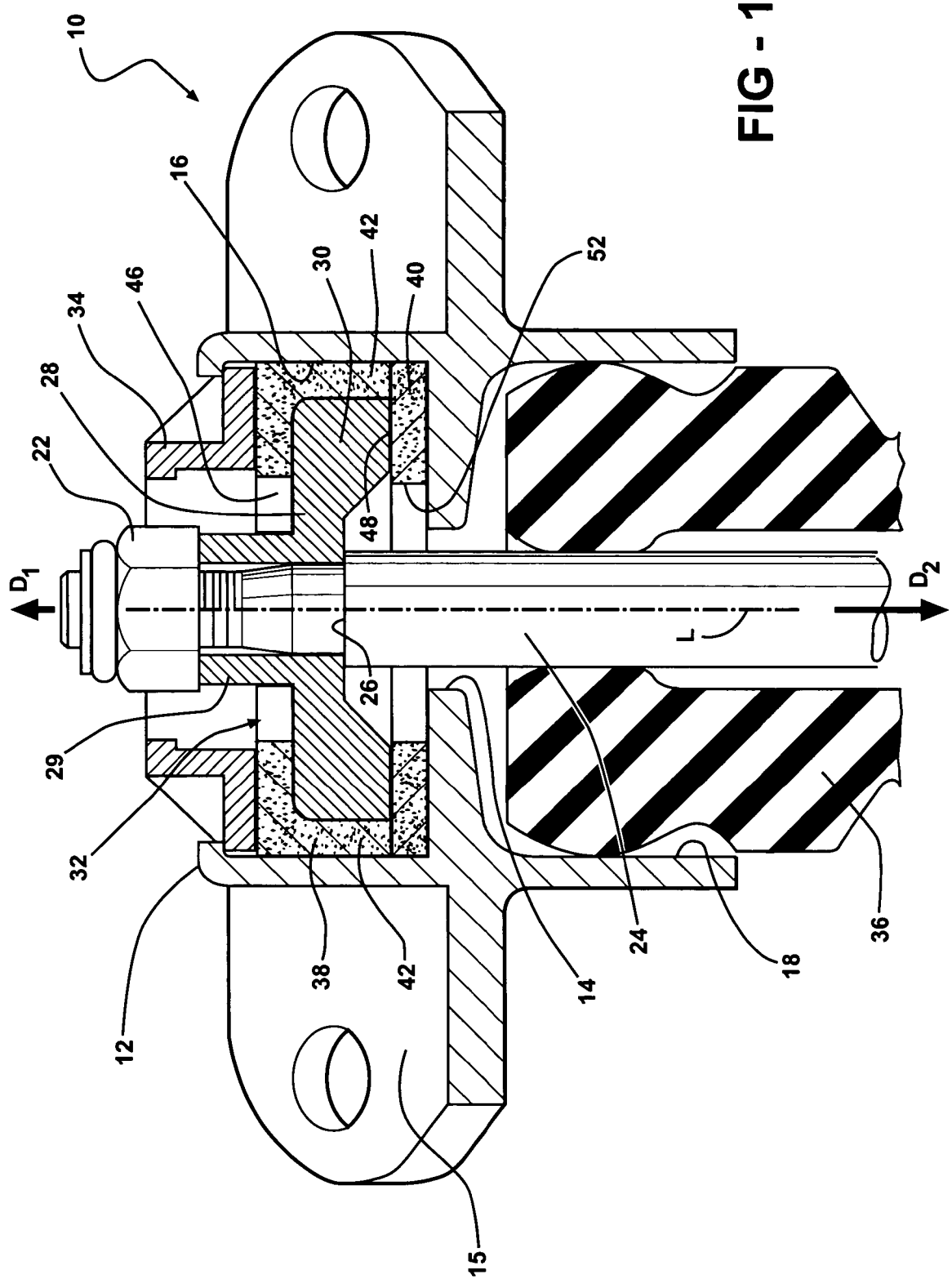
FIG. 1 is a partially cross-sectional side view of a mounting assembly in accordance with the subject invention.
Figure 2:
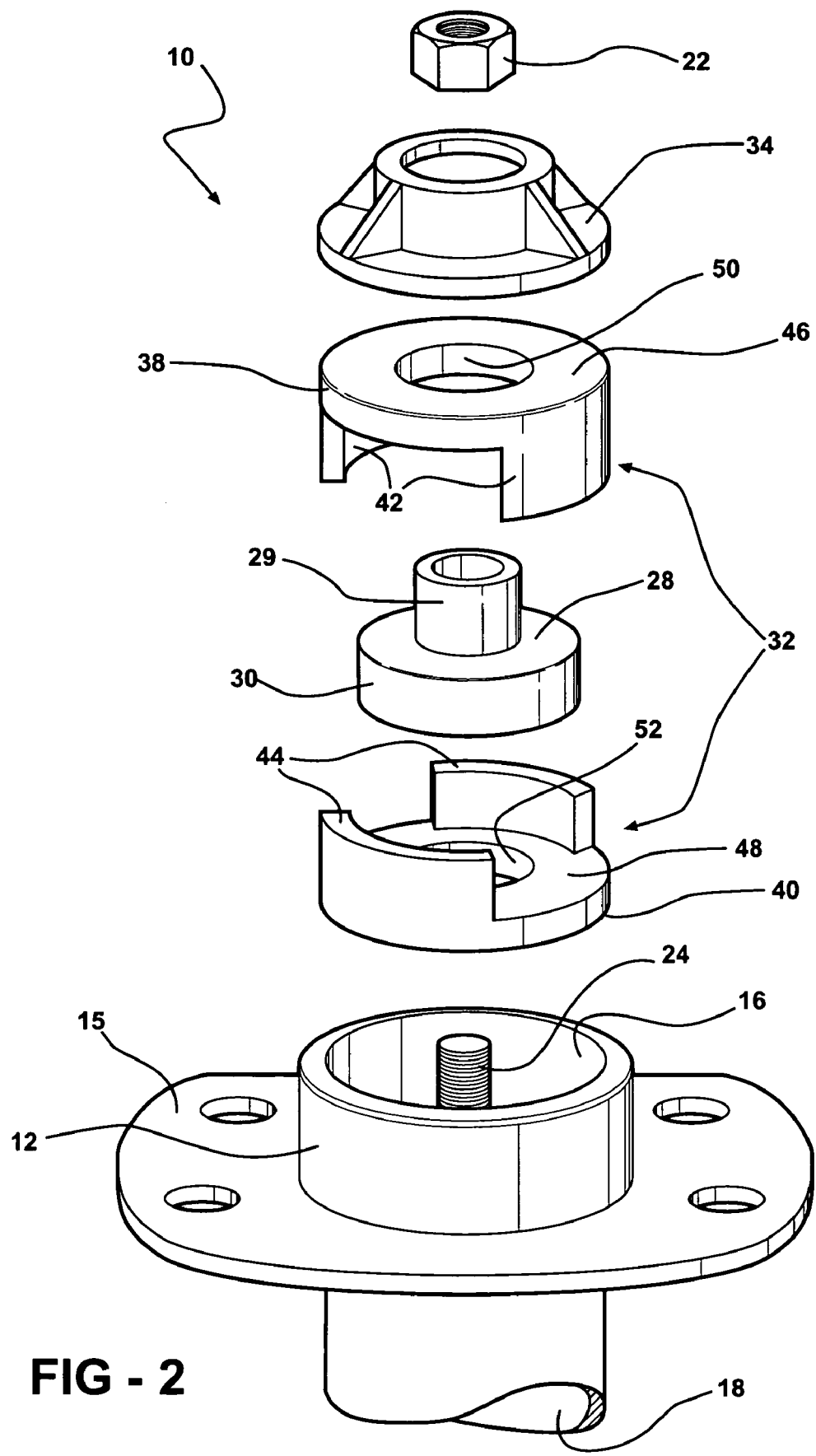
FIG. 2 is an exploded perspective view of the mounting assembly.

Referring to the Figures, wherein like numerals indicate like or corresponding parts throughout the several views, a mounting assembly in accordance with the subject invention is generally shown at 10 in FIGS. 1 and 2. The mounting assembly 10 is shown in a rest state in FIG. 1. In the preferred embodiment, the mounting assembly 10 is for a wheel suspension system of a vehicle having a vehicle body (not shown). The wheel suspension system is only partially illustrated in the Figures. Wheel suspension systems for vehicles are well known in the art and as such will not be discussed in any greater detail. In addition, it should be appreciated by those skilled in the art that any suitable suspension system and any type of vehicle body could be used in conjunction with the subject invention. Further, it should be appreciated that the mounting assembly 10 may be used in other suitable applications, such as a body mount for isolating vibration and controlling movements of a vehicle frame relative to a vehicle body. Hence, the subsequent discussion of the mounting assembly 10 relative to the wheel suspension system is in no way limiting.

The mounting assembly 10 includes a support housing 12 having an aperture 14. The support housing 12 is preferably a stamped or forged piece of metal configured to define a number of different cavities for a number of different functions. Of course the support housing 12 could be of any suitable design or configuration without deviating from the overall scope of the subject invention. Specifically, the support housing 12 has a pair of flanges 15 for mounting the support housing 12 to the vehicle body or frame as is known in the art. In addition, the support housing 12 includes a first cup 16 and a second cup 18 with the cups 16, 18 facing in opposite directions from each other. The first 16, and second 18 cups define two cavities.

A shaft 24 is at least partially disposed within the aperture 14 and is displaceable relative to the support housing 12 along a line of travel L in either a first $D_1$ or second $D_2$ direction. The first $D_1$ and second $D_2$ directions, as indicated by the arrows in FIG. 1, are opposing directions along the line of travel L. It should be appreciated, that the shaft 24 may also be displaced angularly relative to the line of travel L. As will be discussed in greater detail below, the shaft 24 is coupled to the support housing 12 and experiences small amplitude vibrations. In the illustrated embodiment, the shaft 24 is further shown as a piston rod 24. Piston rods of this type are frequently used with wheel suspension systems. The piston rod 24 includes an integral ledge 26, the purpose of which will be discussed in greater detail below.

A rigid core 28 is mounted to the shaft 24, or piston rod 24, and moves relative to the support housing 12 during the displacement of the shaft 24. Preferably, the rigid core 28 abuts the ledge 26 on the piston rod 24 to position the core 28 on the piston rod 24. The rigid core 28 includes a sleeve 29 abutting the piston rod 24 and a disc 30 extending outwardly from the sleeve 29. Preferably the sleeve 29 also abuts the ledge 26. In the most preferred embodiment, the disc 30 is substantially circular and extends outwardly from the sleeve 29 equidistantly on all sides. A nut 22 threadingly engages a distal end of the piston rod 24 and abuts the sleeve 29 such that the sleeve 29, and rigid core 28, is sandwiched between the nut 22 and the ledge 26. This engagement fixedly mounts the rigid core 28 to the piston rod 24. It should be appreciated that the rigid core 28 may be of any suitable configuration, such as oval or rectangular.

In order to couple the shaft 24 or piston rod 24 to the support housing 12 and to provide the necessary isolation for the mounting assembly 10, the subject invention includes an insulator 32. In the embodiment illustrated, a jounce bumper 36 is also included for coupling the piston rod 24 to the support housing 12. Specifically, the jounce bumper 36 is disposed within the second cup 18 about the piston rod 24 for isolating impacts of the wheel suspension system. The jounce bumper 36 is not mounted to the piston rod 24 and has an inner diameter configured such that the displacements of the piston rod 24 along directions $D_1$ and $D_2$ are not transmitted into the jounce bumper 36. Portions of the wheel suspension system, such as a shock tube (not shown), engage the jounce bumper 36 during intermittent high amplitude movements of the suspension system. The jounce bumper 36 is formed of an appropriate elastomeric material such as rubber or micro-cellular polyurethane to adequately translate the high amplitude movements of the shock tube. It should be appreciated that the subject invention is in no way limited to having both the insulator 32 and the jounce bumper 36 and it is contemplated that the subject invention could be applied when the jounce bumper 36 is not present.

The insulator 32 is disposed about the rigid core 28 between the support housing 12 and the rigid core 28. Preferably, the insulator 32, as well as the rigid core 28 and a portion of the piston rod 24, are retained within the first cup 16 of the support housing 12. A top plate 34 is positioned over the insulator 32 and at least a portion of the rigid core 28 for at least partially enclosing the first cup 16 of the support housing 12. Preferably, the insulator 32 is preloaded, i.e., compressed, between the top plate 34 and first cup 16.

The insulator 32 is formed of an elastomeric material such as rubber or micro-cellular polyurethane. The micro-cellular polyurethane material is preferred but not required for the subject invention. The elastomeric material of the insulator 32 is primarily designed to isolate small amplitude vibrations of the piston rod 24. The specific configuration and operation of the insulator 32 is now discussed in greater detail.

The insulator 32 has a plurality of portions 38, 40 separable from each other and separately placed about the rigid core 28. Each of the portions 38, 40 are preloaded between the top plate 34 and first cup 16 such that these portions 38, 40 do not separate during movement of the piston rod 24 in either the first $D_1$ or second $D_2$ directions.

The portions 38, 40 each have interlocking sections 42, 44 cooperating with each other to couple the portions 38, 40 together and encapsulate the rigid core 28 such that the rigid core 28 is isolated from the support housing 12. Preferably, as discussed in greater detail below, the interlocking sections 42, 44 on the portions 38, 40 are identical. As best shown in FIG. 2, the interlocking sections 42, 44 on the portions 38, 40 are further defined as legs 42, 44 with the legs 42, 44 cooperating with each other couple the portions 38, 40 together.

In the most preferred embodiment, the plurality of portions 38, 40 of the insulator 32 are further defined as a first portion 38 having a first interlocking section 42 and a second portion 40 having a second interlocking section 44. The first interlocking section 42 cooperates with the second interlocking section 44 to couple the first portion 38 to the second portion 40 for fully encapsulating the rigid core 28 such that the rigid core 28 is completely isolated from the support housing 12. It should be appreciated that there may be any number of portions as desired, such as three, five, eight, etc, so long as the rigid core 28 is adequately encapsulated. The illustrations and subsequent discussion of having two portions is purely for descriptive purposes and is in no way limiting.

In the most preferred embodiment, the first 38 and second 40 portions are substantially identical such that each of the first 38 and second 40 portions encapsulate substantially half of the rigid core 28. As shown in FIG. 1, the top plate 34 abuts the first portion 38 of the insulator 32 to wedge the first portion 38 between the top plate 34 and the rigid core 28 and to wedge the second portion 40 between the rigid core 28 and the support housing 12. The first 38 and second 40 portions include an inner surface complementary in configuration with the rigid core 28 and an outer surface complementary in configuration with an inner surface of the support housing 12. Preferably, the inner surfaces of the first 38 and second 40 portions are preferably circular to mate with the circular disc 30 of the rigid core 28. Also, the outer surfaces of the first 38 and second 40 portions are preferably circular to mate with the annular inner surface of the support housing 12. Of course, these geometrical configurations of the rigid core 28, first 38 and second 40 portions, and support housing 12 could be altered without deviating from the scope of the subject invention. As discussed above, the core 28 could be oval or rectangular such that the inner surfaces of the first 38 and second 40 portions could likewise be oval or rectangular.

As best shown in FIG. 2, the first 42 and second 44 interlocking sections are further defined as first 42 and second 44 legs, respectively, with the first 42 and second 44 legs cooperating with each other to couple the first 38 and second 40 portions together. In particular, the first portion 38 includes a first body 46 with the first leg 42 extending from the first body 46 for partially encapsulating the rigid core 28. The second portion 40 includes a second body 48 with the second leg 44 extending from the second body 48. The first 46 and second 48 bodies as well as the first 42 and second 44 legs may be of uniform thickness, such as shown, or may be of variable thicknesses without deviating from the scope of the subject invention.

The first body 46 is further defined as a first planar section 46 having a hole 50 disposed therein, and wherein the second body 48 is further defined as a second planar section 48 having a hole 52 disposed therein. The holes 50, 52 align when the first 38 and second 40 portions are mounted to the rigid core 28 such that the piston rod 24 can pass therethrough. Preferably, the first leg 42 includes a pair of first legs 42 equally spaced about the first planar section 46. Similarly, the second leg 44 includes a pair of second legs 44 equally spaced about the second planar section 48. The first legs 42 cooperate with the second legs 44 to couple the first 38 and second 40 portions together. As also shown in FIG. 1, the first legs 42 of the first portion 38 abut the second planar section 48 of the second portion 40 when the first 38 and second 40 portions are coupled together. Similarly, the second legs 44 of the second portion 40 abut the first planar section 46 of the first portion 38 when the portions 38, 40 are coupled together. As illustrated, both of the first 46 and second 48 bodies and the first 42 and second 44 legs are substantially identical. Further, the first 38 and second 40 portions of the insulator 32 are formed of a common homogeneous material. Preferably, the common homogeneous material is further defined as micro-cellular polyurethane.

During operation of the illustrated mounting assembly 10, the piston rod 24 will intermittently experience small amplitude vibrations, which define one or more forces traveling in one or more directions. The rigid core 28, which is fixed to the piston rod 24, will also experience these vibrations. The rigid core 28 transmits these vibrations to the insulator 32, which in turn isolates these vibrations from the support housing 12. As such, the vibrations are not translated into a passenger compartment of the vehicle. Specifically, if the forces are acting along the direction $D_1$, then the first body 46 of the first portion 38 will limit the displacement. Similarly, if the forces are acting along the direction $D_2$, then the second body 48 of the second portion 40 will limit the displacement. Also, if the forces act transverse to the directions $D_1$ and $D_2$, then one or more of the first 42 and second 44 interlocking sections will limit the displacement. Of course compound forces acting in multiple directions will be handled by multiple parts of the first 38 and second 40 portions.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A mounting assembly for a vehicle, said mounting assembly comprising:
   a support housing having an aperture and adapted to be mounted to the vehicle;
   a shaft at least partially disposed within said aperture and displaceable relative to said support housing along a line of travel;
   a rigid core fixedly mounted to said shaft and movable relative to said support housing daring displacement of said shaft; and
   an insulator disposed about said rigid core between said support housing and said rigid core;
   said insulator having a plurality of portions separable from each other and separately placed about said rigid core with each of said portions at least partially in direct contact with said rigid core and each of said portions having substantially identical interlocking sections cooperating with each other to couple said portions together and encapsulate said rigid core, and each of said portions of said insulator being formed of an elastomeric material such that said rigid core is isolated from said support housing;
   wherein said plurality of portions of said insulator are further defined as a first portion and a second portion, said first portion having a first body and a first interlocking section, said second portion having a second body and a second interlocking section;
   wherein said first body is further defined as a first planar section having a hole disposed therein and said second body is further defined as a second planar section having a hole disposed therein; and
   wherein said first interlocking section is further defined as a pair of first legs extending from said first body and equally spaced about said first planar section and wherein said second interlocking section is further defined as a pair of second legs extending from said second body and equally spaced about said second planar section with said first legs cooperating with said second legs to couple said first and second portions together.

2. An assembly as set forth in claim 1 wherein said first and second portions are substantially identical such that each of said first and second portions encapsulate substantially half of said rigid core.

3. An assembly as set forth in claim 1 wherein said first and second portions include an inner surface complementary in configuration with said rigid core and an outer surface complementary in configuration with an inner surface of said support housing.

4. An assembly as set forth in claim 1 wherein both of said first and second bodies and said first and second legs are substantially identical.

5. An assembly as set forth in claim 1 wherein said first and second portions of said insulator are formed of a common homogeneous material.

6. An assembly as set forth in claim 5 wherein said common homogeneous material is further defined as micro-cellular polyurethane.

7. An assembly as set forth in claim 1 wherein said shaft is further defined as a piston rod.

8. An assembly as see forth in claim 7 wherein said piston rod further includes an integral ledge with said core abutting said ledge to position said core on said piston rod.

9. An assembly as set forth in claim 7 wherein said support housing defines a first cup for retaining said first and second portions of said insulator, said rigid core, and a portion of said piston rod.

10. An assembly as set forth in claim 9 further including a top plate positioned over said insulator and at least a portion of said rigid core for at least partially enclosing said first cup of said support housing.

11. An assembly as set forth in claim 10 wherein said top plate abuts said first portion of said insulator to wedge said first portion between said top plate and said rigid core and to wedge said second portion between said rigid core and said support housing.

12. An assembly as set forth in claim 9 wherein said support housing further includes a second cup opposite said first cup with a jounce bumper disposed within said second cup about said piston rod.

13. An assembly as set forth in claim 1 wherein said pairs of first and second legs each include a distal end with said distal ends of said first legs disposed between said distal ends of said second legs and said second body and said distal end of said second legs disposed between said distal ends of said first legs and said first body.

14. An assembly as set forth in claim 13 wherein said distal ends of said first legs of said first portion at least partially abut said second body of said second portion and said distal ends of said second legs of said second portion at least partially abut said first body of said first portion.

15. An insulator for a mounting assembly of a vehicle wherein the mounting assembly includes a support housing mounted to the vehicle, a shaft displaceable relative to the support housing along a line of travel, and a rigid core fixedly mounted to the shaft with said insulator disposed about the rigid core between the support housing and the rigid core, said insulator comprising;
   a first portion, formed of an elastomeric material, having a first body and a first interlocking section extending from said first body for partially encapsulating the rigid core with said first body further defined as a first planar section having a hole disposed therein; and
   a second portion, formed of an elastomeric material, separable from said first portion with said second portion substantially identical to said first portion and having a
   second body and a second interlocking section extending from said second body with said second body further defined as a second planar section having a hole disposed therein;
   said second interlocking section being substantially identical to said first interlocking section and said first interlocking section cooperating with said second interlocking section to couple said first portion to said second portion for fully encapsulating the rigid core such that the rigid core is completely isolated from the support housing;
   wherein said first interlocking section is further defined as a pair of first legs equally spaced about said first planar section and said second interlocking section is further defined as a pair of second legs equally spaced about said second planar section with said first legs cooperating with said second legs to couple said first and second portions together.

16. An assembly as set forth in claim 15 wherein said first and second portions are formed of a common homogeneous material.

17. An assembly as set forth in claim 16 wherein said common homogeneous material is further defined as microcellular polyurethane.

18. An assembly as set forth in claim 15 wherein said pairs of first and second legs each include a distal end with said distal ends of said first legs disposed between said distal ends of said second legs and said second body and said distal end of said second legs disposed between said distal ends of said first legs and said first body.

19. An assembly as set forth in claim 18 wherein said distal end of said first legs of said first portion at least partially abut said second body of said second portion and said distal end of said second legs of said second portion at least partially abut said first body of said first portion.

* * * * *